No. 666,076. Patented Jan. 15, 1901.
T. W. WAILES & G. F. MASON.
MEANS FOR CARRYING WATER OR OTHER LIQUID BALLAST OR CARGO IN SHIPS, &c.
(Application filed June 23, 1900.)
(No Model.) 3 Sheets—Sheet 1.

No. 666,076. Patented Jan. 15, 1901.
T. W. WAILES & G. F. MASON.
MEANS FOR CARRYING WATER OR OTHER LIQUID BALLAST OR CARGO IN SHIPS, &c.
(Application filed June 23, 1900.)
(No Model.) 3 Sheets—Sheet 2.
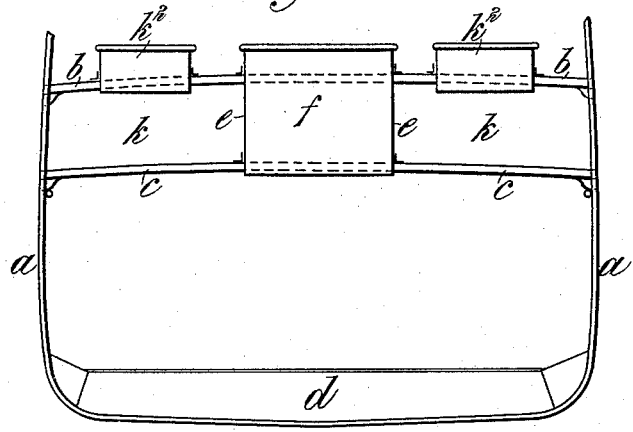
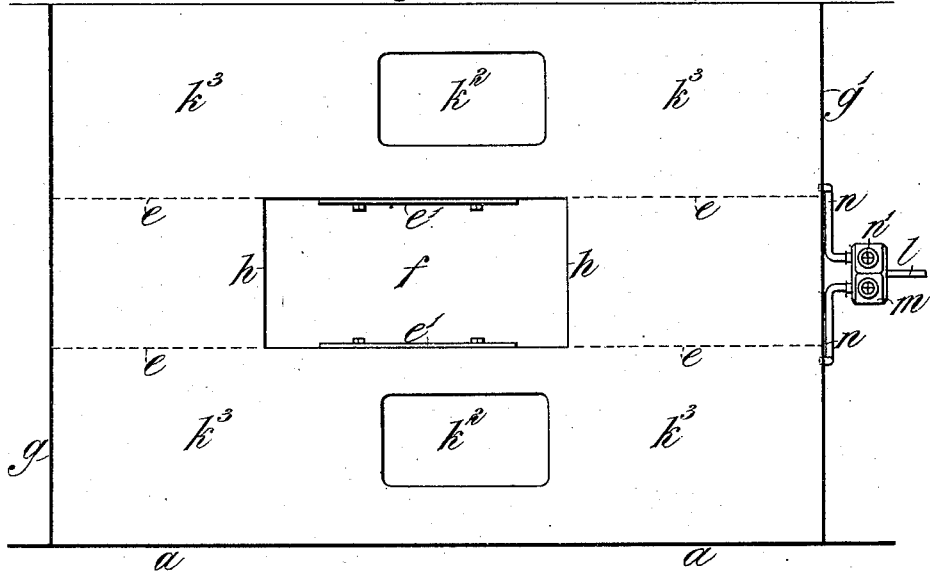

No. 666,076. Patented Jan. 15, 1901.
T. W. WAILES & G. F. MASON.
MEANS FOR CARRYING WATER OR OTHER LIQUID BALLAST OR CARGO IN SHIPS, &c.
(Application filed June 23, 1900.)
(No Model.) 3 Sheets—Sheet 3.

UNITED STATES PATENT OFFICE.

THOMAS W. WAILES AND GEORGE F. MASON, OF CARDIFF, ENGLAND.

MEANS FOR CARRYING WATER OR OTHER LIQUID BALLAST OR CARGO IN SHIPS, &c.

SPECIFICATION forming part of Letters Patent No. 666,076, dated January 15, 1901.

Application filed June 23, 1900. Serial No. 21,269. (No model.)

*To all whom it may concern:*

Be it known that we, THOMAS WATERS WAILES and GEORGE FREDERICK MASON, subjects of the Queen of Great Britain, residing at Cardiff, in the county of Glamorgan, England, have invented certain new and useful Means for Carrying Water or other Liquid Ballast or Cargo in Steamships or other Vessels, of which the following is a full, clear, and exact description, and for which we have made application for patent in Great Britain, dated the 4th day of December, 1899.

The object of this invention is to provide means for carrying water or other liquid ballast or cargo in the between-decks or high above the bottom of ships' holds in steamers or sailing vessels.

In order that our invention may be clearly understood, we will describe the same by the aid of the accompanying drawings, in which—

Figure 1:
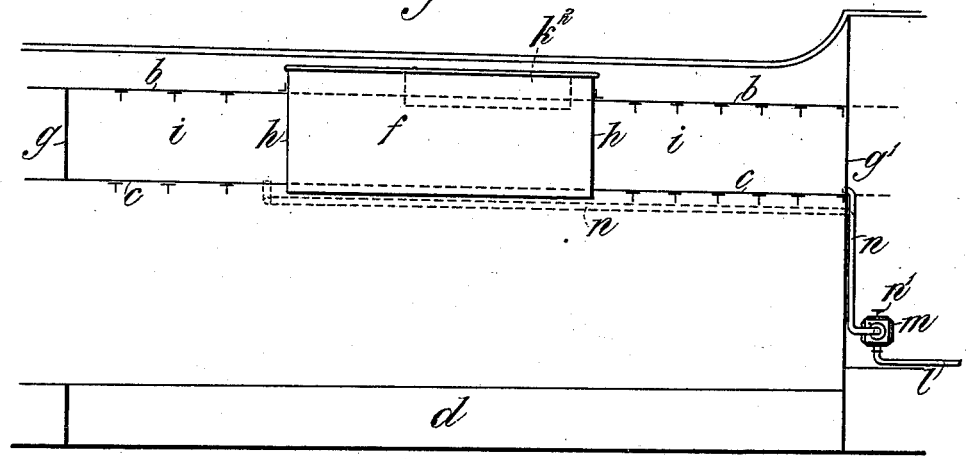
Figure 2:
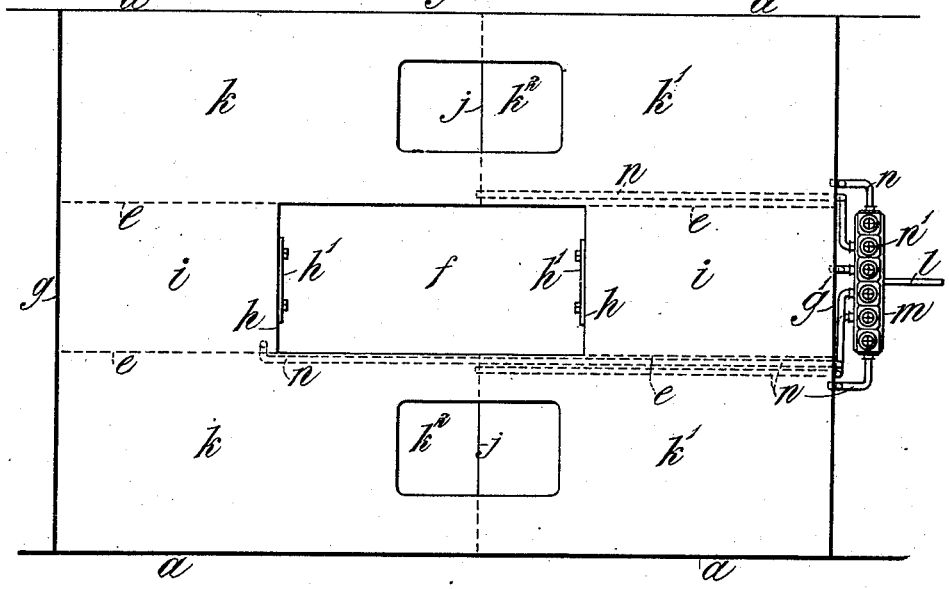

Figure 1 is a longitudinal section, and Fig. 2 a plan, of part of a vessel, showing one method of carrying our invention into effect. Fig. 3 is a cross-section of Figs. 1 and 2, and Figs. 4, 5, and 6 are plans representing slight modifications.

In the arrangements represented at Figs. 1 to 4, $a$ represents the sides of the vessel; $b$, the upper deck; $c$, the between-deck, and $d$ the space in the double bottom to contain water ballast.

In carrying our invention into effect we construct fore-and-aft bulkheads $e\ e$, one on each side of the main and upper deck hatch $f$, from the hold-bulkhead $g$ forward of hatch $f$ to the hold-bulkhead $g'$ aft of said hatch, thus forming a trunkway to hold underneath.

In the arrangement shown at Figs. 1 and 2 thwartship bulkheads $h\ h$ are fixed at the ends of the deck-hatch $f$ between the fore-and-aft bulkheads $e\ e$, thus forming tanks $i\ i$ at the ends of the hold-hatch, while thwartship bulkheads $j\ j$ are fixed between the fore-and-aft bulkheads $e\ e$ and the sides of the vessel, thus forming tanks $k\ k'$ on each side of the hold-hatch $f$. Water-tight removable doors $h'$ are fitted to the bulkheads $h\ h$ to afford access to the tanks $i\ i$ when the latter are used for ordinary cargo. Access is afforded to the tanks $k\ k'$, respectively, by a hatch $k^2$, arranged partly over each pair of tanks $k\ k'$ and at each side of the hold-hatch $f$. The tanks $i\ i$ may also be provided with hatches.

In the modification shown at Fig. 4 only two large tanks $k^3$ are shown, the tanks $i\ i$ being dispensed with. Each of said tanks $k^3$ extends from bulkhead $g$ to bulkhead $g'$ and from a fore-and-aft bulkhead $e$ to the side of the ship. In this case water-tight removable doors $e'$ can be fitted, if desired, to the bulkheads $e\ e$ to afford access to the tanks $k^3$ when the latter are used for ordinary cargo. Access is also obtained to the tanks $k^3$ through tank-hatches $k^2$, the whole of the trunkway inclosed by bulkheads $e\ e$ being open to the lower hold.

Figure 5:
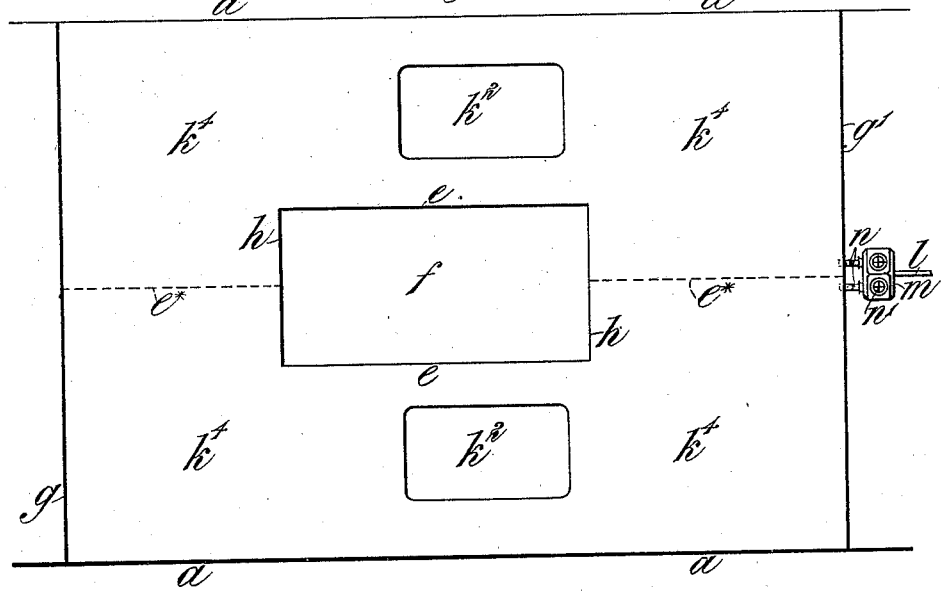

In the modification shown at Fig. 5 the center trunkway does not extend beyond the limits of the hold-hatch $f$, and instead of using two fore-and-aft water-tight bulkheads $e\ e$, as in the forms shown at Figs. 1 to 4, a fore-and-aft water-tight bulkhead $e^*$ is fitted at each end of the hold-hatch trunkway and continued to the hold-bulkheads $g\ g'$. Tanks $k^4$ are thus formed on each side of the hatch $f$, which extend from bulkhead $g$ to bulkhead $g'$ and partly across the ends of the hatch $f$. Access to the tanks $k^4$ can be obtained by means of the hatches $k^2$ and movable water-tight doors $e'$, as in the modification shown at Fig., 4, if required.

Figure 6:
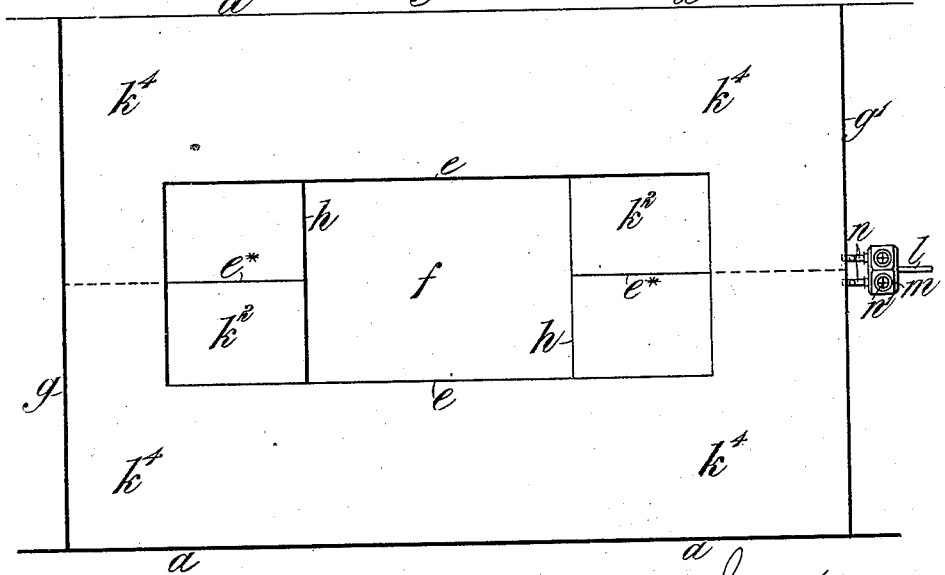

In the modification shown at Fig. 6 the tanks $k^4$ and hold-hatch $f$ are of similar construction and arrangement to those of the modification shown at Fig. 5; but the hatchways $k^2$, instead of being formed separately at the sides of the hatch $f$, are formed in the center of the ship as a continuation of the trunkway-hatch $f$.

The above constructions of tanks can be applied either to the main and upper decks, the main and orlop decks, or the upper and bridge decks, and any or either of the above arrangements can be adapted so as to include a second between-deck or bridge-deck, the trunkways and hatches being made to suit.

The various fore-and-aft and transverse bulkheads forming the several tanks are connected water-tight with the decks above and below the same, and the tank-hatches are covered with water-tight removable covers.

By the means above described water or other liquids may be carried on each side and, if desired, at the ends of the center hatch to serve as ballast or cargo.

The tanks may be filled with water by means of a ballast-pump communicating with a pipe $l$, connected with a chamber $m$, into which the pipes $n$, connected with the various tanks, lead, and such chamber $m$ is fitted with valves $n'$ to open or close the communication between such pipes $n$ and the chamber $m$, so as to enable one or more of the tanks to be filled at a time. The tanks may be emptied of their water-ballast by valves, cocks, or non-return valves through the ship's side above the water-line or below, if necessary, or the water ballast can be made to run from the tanks through pipes into the water-ballast space $d$ in the vessel's double bottom.

The tanks can be filled with liquid cargo by means of flexible pipes led into the various tank-hatchways.

We are aware that ships have been made with double skins to carry water ballast, which decreases the cubic or carrying capacity of the ship. Our invention, however, does not in any way interfere with such capacity or affect the tonnage, as our tanks are merely good cargo-space utilized for ballast.

Having thus fully described our invention, what we claim, and desire to secure by Letters Patent, is—

1. In a ship, the combination of a hull, an upper deck, a between-deck arranged from side to side of the hull, a hold for cargo below such between-deck, a trunkway from the deck to the hold, a number of tanks arranged around such trunkway, and water-tight doors arranged in the sides of the trunkway, substantially as set forth.

2. In a ship, the combination of a hull, an upper deck, a lower deck, a hold for cargo below such lower deck, a trunkway from the upper deck to the hold, a number of tanks arranged around the trunkway between the two decks, water-tight doors in the sides of the trunkway, and a hatch arranged above each tank, substantially as set forth.

3. In a ship, the combination of a hull, an upper deck, a lower deck, a trunkway connecting the upper and lower decks, fore-and-aft bulkheads and thwartship bulkheads extending from the upper to the lower decks forming tanks around the trunkway, substantially as set forth.

4. In a ship, the combination of a hull, an upper deck, a lower deck, a trunkway connecting the upper and lower decks, fore-and-aft bulkheads and thwartship bulkheads extending from the upper to the lower decks forming tanks around the trunkway, water-tight doors arranged in the sides of the trunkway, and a hatch arranged above each tank, substantially as set forth.

In testimony whereof we affix our signatures in presence of two witnesses.

T. W. WAILES.
GEO. F. MASON.

Witnesses:
CHARLES HUGHES,
HENRY JAMES THOMAS.